Feb. 12, 1957     O. W. NICKS     2,780,913

VARIABLE CONFIGURATION JET INLET

Filed Nov. 30, 1953     2 Sheets-Sheet 2

INVENTOR.
ORAN W. NICKS

BY *William R. Lane*

ATTORNEY

United States Patent Office 2,780,913
Patented Feb. 12, 1957

2,780,913

VARIABLE CONFIGURATION JET INLET

Oran W. Nicks, Inglewood, Calif., assignor to North American Aviation, Inc.

Application November 30, 1953, Serial No. 395,056

9 Claims. (Cl. 60—35.5)

This invention relates to jet engine inlets and more particularly to an air inlet having variable leading edge configuration.

For high-speed jet-propelled flight, air induction systems having sharp leading edge inlets provide low drag and good pressure recovery characteristics. For static and low-speed operation, however, these sharp-edged inlets are very unsatisfactory because air is being drawn from all sides and tends to separate around the sharp leading edge. The turbulence created by this separation, in effect, restricts the inlet area, prevents obtaining the desired airflow, and results in a reduction in static and take-off thrust. It is usually necessary to design such an air inlet to give better performance for static operation and hence somewhat lower performance at maximum flight speeds due to increased cowl drag. The most satisfactory configuration for static and low-speed operation has been found to be a blunt or rounded leading edge which provides smooth flow with low losses and without the above-mentioned separation and turbulence.

The device of this invention contemplates the use of a fluid inlet leading edge having variable configuration so as to be able to assume satisfactory inlet characteristics during both high-speed and static and low-speed operation.

It is an object of this invention to provide an inlet for a fluid induction system having good operating characteristics at both high and low fluid speeds.

It is another object of this invention to provide, for a jet engine, an air inlet having good operating characteristics at both high and low flight speeds.

It is another object of this invention to provide, for a jet engine, a variable-shape-lip inlet having good pressure recovery and low drag at high flight speeds and smooth flow with no separation and low losses at low flight speeds.

It is still another object of this invention to provide, for a jet engine, an expandable lip inlet having good pressure recovery characteristics and low drag at high flight speeds and smooth flow with no separation and low losses at low flight speeds.

Other objects of invention will become apparent from the following description taken in connection with the accompanying drawings, in which Fig. 1 is an elevational view of the jet engine inlet partially broken away to show the structure of the lip constructed in accordance with the preferred form of this invention;

Figs. 2 and 3 are semi-schematic views of a sharp-edged inlet cowl and a round-edged inlet cowl for a jet engine, respectively, showing the airflow thereof during static and low-speed operation thereof;

Figs. 4 and 5 are semi-schematic views similar to Figs. 2 and 3 but showing the airflow under high-speed flight conditions;

Figure 9:
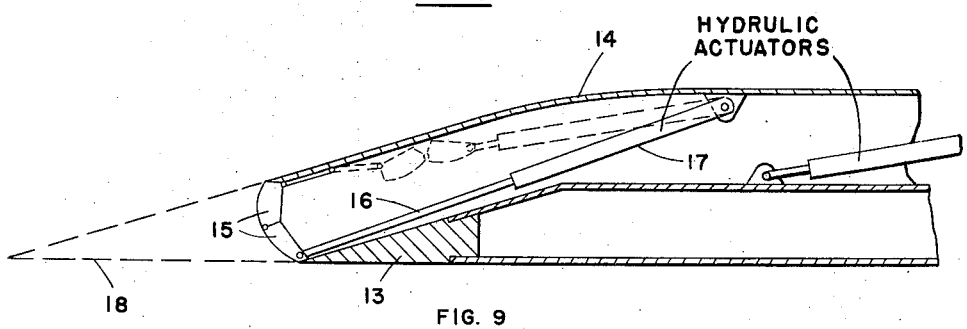
Fig. 9 is a sectional view taken along line 9—9 of Fig. 8 and showing a modified form of expandable lip for the inlet.
Figure 10:
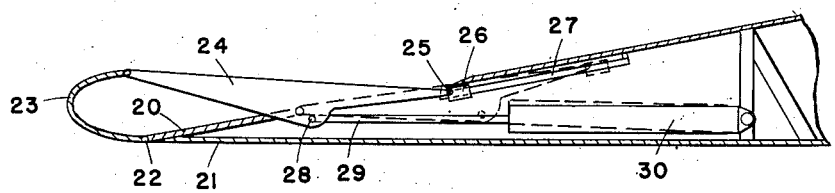

And Fig. 10 is a sectional view similar to Fig. 9 but showing a further modification of the expandable lip thereof.

In detail, Fig. 1 shows the inlet cowl, generally designated 1, for a conventional jet engine 2. Inlet cowl 1 is formed with rigid, sharp leading edge or lip 3 so as to provide cowl 1 with good operating characteristics during flight at high speeds, to be later described. Surrounding the exterior of cowl 1 and secured thereto is expandable boot 4 shown in the inflated position in Fig. 1. The deflated position of boot 4 is shown by the dotted line at 5, and the inflation of boot 4 may be caused by forcing high pressure fluid into the space 6 between boot 4 and the exterior of cowl 1 through pipe 7 from pressure source or pump 8.

As shown schematically in Figs. 2, 3 during static and low-speed operation air is pulled into engine 2 through inlet cowl 1 from all sides. In the case of a sharp-edged lip 9 (Fig. 2) the incoming air will tend to separate and form turbulence as at 10. This turbulence restricts the effective inlet area thereby preventing the engine from obtaining the desired airflow and resulting reduction in static and takeoff thrusts. In the case of a round-edge leading lip 11 (Fig. 3) the air is drawn in from all sides and the airflow lines are such that no turbulence and resulting effects occur.

At high speeds the operating characteristics of the two aforementioned inlet configurations are reversed as shown in Figs. 4 and 5. During high-speed operation the sharp-edged lip 9 (Fig. 4) provides low drag and good pressure recovery characteristics. Conversely, at high speeds the round-edged lip 11 (Fig. 5) gives poor performance because of its increased drag.

Figure 6:
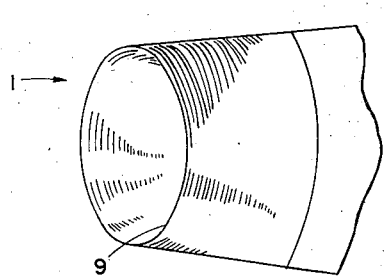
Fig. 6 is a perspective view of the inlet cowl of Fig. 1 showing the lip deflated and the sharp leading edge thereof.
Figure 7:
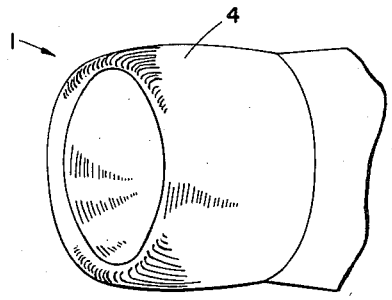
Fig. 7 is a perspective view similar to Fig. 6 but showing the lip expanded and the round leading edge thereof.
Figure 8:
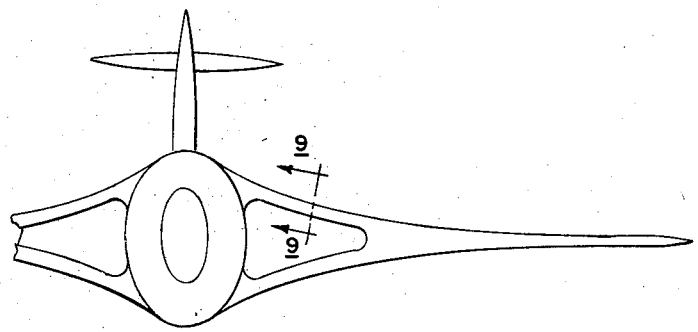
Fig. 8 is a front elevational view of an airplane having a two-dimensional, variable-shape-lip inlet.

Hence, the desirability is seen of having an inlet cowl lip whose configuration may be varied to fit all operational conditions. Such a cowl is shown in Figs. 6 and 7 in perspective in its deflated or high-speed operating position and its inflated or low-speed operating position, respectively. The device shown in Fig. 1 is particularly adaptable to a curvate or circular inlet such as is shown in Figs. 6, 7.

Where the leading lip of an inlet is substantially straight, or variable in two dimensions only, as is the case with the triangular inlets shown in Fig. 8, other variable configuration devices may be employed. The sectional view in Fig. 9 shows one of such modifications in its retracted or round-edged position. The device of Fig. 9 comprises a reciprocable, sharp-edged member 13 underlying the outer skin 14 of the inlet. Between skin 14 and member 13 are a plurality of hingedly-interconnected arcuately faced elements 15 which are hingedly connected at one end to the forward end of skin 14 and at the other end to operating link 16 which is adapted to be actuated by a hydraulic cylinder 17. Elements 15 and member 13 extend the full length of the inlet edges and in the position shown in Fig. 9 elements 15 are positioned so as to provide a continuous rounded lip between the leading edge of skin 14 and the leading edge of member 13 to provide the beneficial static and low-speed operating characteristics previously described.

The shape of the lip thus formed may be changed for high-speed operation by retracting link 16 into cylinder 17, withdrawing elements 15 to the dotted line position, and extending member 13 forwardly (as by hydraulic means, not shown) to the position shown by the dot-dash line 18. The lower lip of the inlet shown in Fig. 8 is constructed and operated in the same manner.

In the modification shown in Fig. 10 the fixed portion of the inlet is formed by external and internal skin members 20, 21 coming to sharp edge 22. Pivotally connected to sharp edge 22 is one edge of flexible sheet 23 which is bowed so as to provide a rounded lip. The opposite edge of sheet 23 is pivotally connected to a plurality of three-pivot links 24 which extend rearwardly therefrom. The rearmost pivot 25 of link 24 is secured to block 26 which is adapted to slide on guide 27 between skin members 20 and 21. The intermediate pivot 28 is secured to operating link 29 which is adapted to be withdrawn into hydraulic cylinder 30 upon suitable actuation thereof. When it is desired to change the characteristics of the leading lip from those suitable at static and low-speed operation to those suitable at high-speed operation the withdrawal of link 29 by cylinder 30 will cause link 24 to slide rearwardly thereby pulling sheet 23 to a position overlying sheet 20 and forming a sharp-edged lip.

It will be noted that even in the case of a curved-lip inlet the devices shown in Figs. 9 and 10 may be provided in short adjoining or overlapping sections arranged so as to describe the desired inlet shape.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An inlet for a fluid induction system comprising means forming a constant area inlet having a leading lip, and means for continuously varying the shape of said lip from a sharp edge to a round edge whereby when said lip is sharp-edged it provides low drag and good pressure recovery at high fluid speeds and when said lip is round-edged it provides smooth fluid flow with no separation and low losses at low fluid speeds.

2. An air inlet cowl for a jet engine having good operating characteristics at both high and low flight speeds comprising means forming a constant inlet area having a leading lip, and means for continuously varying the shape of said lip from a sharp edge at high flight speeds to a curvate edge at low flight speeds whereby when said lip is sharp-edged it provides low drag and good pressure recovery at high flight speeds and when said lip is round-edged it provides smooth fluid flow with no separation and low losses at low flight speeds.

3. An air inlet cowl for a jet engine having good operating characteristics at both high and low flight speeds comprising a leading lip expandable from a sharp edge to a round edge and means for so expanding said lip without decreasing the inlet area of said cowl whereby when said lip is sharp-edged it provides low drag and good pressure recovery at high flight speeds and when said lip is round-edged it provides smooth airflow with no separation and low losses at low flight speeds.

4. An air inlet cowl for a jet engine having good operating characteristics at both high and low flight speeds comprising a curvate, sharp-edged, leading lip, an expandable boot surrounding the exterior of said lip, and means for expanding said boot to provide a round-edged lip whereby when said lip is sharp-edged it provides low drag and good pressure recovery at high flight speeds and when said lip is round-edged it provides smooth airflow with no separation and low losses at low flight speeds.

5. An air inlet cowl for a jet engine having good operating characteristics at both high and low flight speeds comprising a curvate sharp-edged leading lip, an expandable, elastic boot surrounding the exterior of said lip, and a source of pressure connected to said boot for expanding said boot to provide a round-edged lip whereby when said lip is sharp-edged it provides low drag and good pressure recovery at high air speeds and when said lip is round-edged it provides smooth airflow with no separation and low losses at low flight speeds.

6. An air inlet cowl for a jet engine having good operating characteristics at both high and low flight speeds comprising a hinged leading lip variable in shape from a sharp edge to a rounded edge and means for so varying the shape of said lip, whereby when said lip is sharp-edged it provides low drag and good pressure recovery at high flight speeds and when said lip is round-edged it provides smooth airflow with no separation and low losses at low flight speeds.

7. An air inlet cowl for a jet engine having good operating characteristics at both high and low flight speeds comprising a hinged-sectioned, rounded lip, a reciprocally mounted sharp-edged lip underlying said rounded lip, means for retracting said rounded lip, and means for extending said sharp-edged lip to a position leading said rounded lip whereby when said sharp-edged lip is leading it provides low drag and good pressure recovery at high flight speeds and when said sharp-edged lip is underlying said rounded lip said rounded lip provides smooth airflow with no separation and low losses at low flight speeds.

8. An air inlet cowl for a jet engine having good operating characteristics at both high and low flight speeds comprising a sharp-edged lip, a flexible, bowed sheet extending from said lip to form a round-edged lip, and means for unbowing and retracting said sheet to a position overlying said sharp-edged lip whereby when said sheet is in said position said sharp-edged lip provides low drag and good pressure recovery at high flight speeds and when said sheet is bowed to form a round-edged lip said round-edged lip provides smooth airflow with no separation and low losses at low flight speeds.

9. An air inlet cowl for a jet engine having good operating characteristics at both high and low flight speeds comprising a sharp-edged lip, a flexible, bowed sheet extending from said lip to form a round-edged lip, a hydraulically operated piston and an associated link for unbowing and retracting said sheet to a position overlying said sharp-edged lip whereby when said sheet is in said position said sharp-edged lip provides low drag and good pressure recovery at high flight speeds and when said sheet is bowed to form a round-edged lip said round-edged lip provides smooth airflow with no separation and low losses at low flight speeds.

References Cited in the file of this patent

UNITED STATES PATENTS

| | | |
|---|---|---|
| 2,409,433 | Hunter | Oct. 15, 1946 |
| 2,632,295 | Price | Mar. 24, 1953 |

FOREIGN PATENTS

| | | |
|---|---|---|
| 607,686 | Great Britain | Sept. 3, 1948 |